(12) United States Patent
Hawker (10) Patent No.: US 11,195,000 B2
(45) Date of Patent: Dec. 7, 2021

(54) SWIPE GESTURE DETECTION SYSTEMS AND METHODS

(71) Applicant: FLIR Belgium BVBA, Meer (BE)

(72) Inventor: Oliver Hawker, Southampton (GB)

(73) Assignee: FLIR Belgium BVBA, Meer (BE)

( * ) Notice: Subject to any disclaimer, the term of this patent is extended or adjusted under 35 U.S.C. 154(b) by 0 days.

(21) Appl. No.: 16/267,052

(22) Filed: Feb. 4, 2019

(65) Prior Publication Data

US 2019/0251339 A1 Aug. 15, 2019

Related U.S. Application Data

(60) Provisional application No. 62/630,162, filed on Feb. 13, 2018.

(51) Int. Cl.
| | |
|---|---|
| *G06K 9/00* | (2006.01) |
| *G06F 3/01* | (2006.01) |
| *G06F 3/041* | (2006.01) |
| *G06F 3/0485* | (2013.01) |
| *G06F 3/0488* | (2013.01) |

(52) U.S. Cl.
CPC ......... *G06K 9/00335* (2013.01); *G06F 3/017* (2013.01); *G06F 3/0416* (2013.01); *G06F 3/0485* (2013.01); *G06F 3/0488* (2013.01); *G06F 2203/04808* (2013.01)

(58) Field of Classification Search
CPC ...... G06F 3/017; G06F 3/0416; G06F 3/0485; G06F 3/0488; G06F 3/04883; G06F 2203/04808; G06K 9/00335
See application file for complete search history.

(56) References Cited

U.S. PATENT DOCUMENTS

| | | |
|---|---|---|
| 9,110,543 B1 | 8/2015 | Dabell |
| 9,244,562 B1 | 1/2016 | Rosenberg et al. |
| 9,395,852 B2 | 7/2016 | Clifton et al. |
| 9,524,041 B2 | 12/2016 | Phulwani et al. |

(Continued)

FOREIGN PATENT DOCUMENTS

WO WO 96/11435 4/1996

OTHER PUBLICATIONS

"QTAN0079: Buttons, Sliders and Wheels Touch Sensor Design Guide", Application Notes & Source Code, AN_10752, Nov. 1, 2011, 10752A-AT42-08/11, 72 pages, Atmel Corporation (Microchip Technology), San Jose, California, United States.

*Primary Examiner* — Alexander Eisen
*Assistant Examiner* — Kebede T Teshome
(74) *Attorney, Agent, or Firm* — Haynes and Boone, LLP (57) ABSTRACT

Techniques are disclosed for systems and methods to facilitate swipe gesture detection. In one example, a method includes detecting tactile input on a touchscreen using at least one of a plurality of sensors associated with a touchscreen. The method further includes storing, in a buffer, an indication of the tactile input. The method further includes determining whether the buffer stores pattern information that matches one of a plurality of predetermined gesture patterns, where the pattern information includes the indication. The method further includes performing an action associated with the one of the plurality of predetermined gesture patterns when the pattern information is determined to match the one of the plurality of predetermined gesture patterns. Related systems are also provided.

20 Claims, 5 Drawing Sheets

(56) References Cited

U.S. PATENT DOCUMENTS

| | | | |
|---|---|---|---|
| 9,811,255 B2 | 11/2017 | Raffa et al. | |
| 2003/0214524 A1* | 11/2003 | Oka | G06K 9/00335 |
| | | | 715/700 |
| 2010/0117978 A1* | 5/2010 | Shirado | G06F 3/0488 |
| | | | 345/173 |
| 2011/0300831 A1* | 12/2011 | Chin | G06F 1/3203 |
| | | | 455/411 |
| 2013/0106686 A1* | 5/2013 | Bennett | G06F 3/017 |
| | | | 345/156 |
| 2017/0242806 A1* | 8/2017 | Solbach | G06F 3/061 |
| 2017/0269696 A1* | 9/2017 | Naidoo | G06F 3/042 |
| 2018/0164892 A1* | 6/2018 | Han | G06F 3/014 |

\* cited by examiner

SWIPE GESTURE DETECTION SYSTEMS AND METHODS

CROSS-REFERENCE TO RELATED APPLICATION

This application claims the benefit of and priority to U.S. Provisional Patent Application No. 62/630,162 filed Feb. 13, 2018 and entitled "SWIPE GESTURE DETECTION SYSTEMS AND METHODS," which is incorporated herein by reference in its entirety.

TECHNICAL FIELD

One or more embodiments of the invention relate generally to gesture detection and more particularly, for example, to swipe gesture detection systems and methods.

BACKGROUND

Computing devices with touchscreens facilitate user interaction with the computing devices. In some cases, such computing devices provide for display graphical user interfaces that can accept tactile input, making such computing devices generally more intuitive, convenient, and/or easier to use (e.g., compared to using an accessory such as an external mouse for receiving input).

SUMMARY

Techniques are disclosed for systems and methods to provide swipe gesture detection. In accordance with one or more embodiments, a swipe gesture system may include a touchscreen, sensors associated with the touchscreen, a logic circuit, and memory.

In one or more embodiments, a method includes detecting tactile input on a touchscreen using at least one of a plurality of sensors associated with a touchscreen. The method further includes storing, in a buffer, an indication of the tactile input. The method further includes determining whether the buffer stores pattern information that matches one of a plurality of predetermined gesture patterns, where the pattern information includes the indication. The method further includes performing an action associated with the one of the plurality of predetermined gesture patterns when the pattern information is determined to match the one of the plurality of predetermined gesture patterns.

In one or more embodiments, a system includes a plurality of sensors configured to receive tactile input associated with a touchscreen. The system further includes a buffer configured to store an indication of the tactile input. The system further includes a gesture detection circuit configured to determine whether the buffer is storing pattern information that matches one of a plurality of predetermined gesture patterns, where the pattern information includes the indication. The system further includes a gesture processing circuit configured to perform an action associated with the one of the plurality of predetermined gesture patterns when the pattern information is determined to match the one of the plurality of predetermined gesture patterns.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Techniques are disclosed for systems and methods for facilitating swipe gesture detection. In accordance with one or more embodiments, a system may include a touchscreen, touch sensors associated with the touchscreen, a logic circuit, and memory. The touch sensors may be used to receive tactile input (e.g., also referred to as touch input or gesture input) from a user, and the logic circuit may determine whether a valid gesture is being performed by the user on the touchscreen via the touch sensors. The tactile input may be from a tactile input instrument, such as the user's finger, a stylus, and/or other tactile input instrument to which the touch sensors are configured to be sensitive. In one aspect, the system may be used to detect horizontal swipe gestures (e.g., left-to-right and/or right-to-left swipe gestures), vertical swipe gestures (e.g., up-down and/or down-up swipe gestures), circular swipe gestures (e.g., clockwise and/or counter-clockwise swipe gestures), and/or other gestures.

By way of non-limiting example, the touchscreen may utilize one or more of a resistive, surface acoustic wave, capacitive, and/or other touchscreen technologies. In this regard, the touchscreen may include or may be in communication with (e.g., coupled to, connected to) one or more touch sensors that can sense signals associated with one or more touchscreen technologies and interpret signals as tactile input. Dependent on the touchscreen technology or technologies utilized, sensed signals received by the logic circuit from the touch sensors may include voltages, sound waves, capacitances, and/or other signals.

In some aspects, the memory of the system may include a lookup table that includes valid gesture patterns. The lookup table may be referred to as a gesture table. In this regard, each entry of the gesture table is a valid gesture pattern. Each valid gesture pattern may include a combination of states of the touch sensors at instances in time (e.g., consecutive instances in time). In an aspect, the touch sensors may be in one of two states (e.g., the touch sensors are binary). Each of the touch sensors may be in an active state when a finger (or other appropriate touch instrument) is present on the touch sensor or an inactive state when no finger is present on the touch sensor.

In some cases, the gesture table may include all valid gesture patterns such that the logic circuit may compare tactile input from the user with entries of the gesture table to determine whether a gesture that is detected for by the system is received from the user.

In other cases, the gesture table may include a subset of the valid gesture patterns. For example, the gesture table may store valid left-to-right gesture patterns. In this example, if the system also detects for right-to-left gestures, the system may leverage symmetry between left-to-right and right-to-left gesture patterns in order to avoid storing right-to left gesture patterns in the gesture table (e.g., to conserve memory consumed by the gesture table). In one example, the system may accommodate for the valid right-to-left gesture patterns by generating a mirrored version of each valid left-to-right gesture patterns stored in the gesture table and comparing received tactile input with the mirrored versions to detect for right-to-left gesture patterns. In another example, rather than generating a mirrored version of each entry of the gesture table, a mirrored version of the received tactile input may be compared with the entries of the gesture table. In this regard, when the received tactile input is a right-to-left gesture, the mirrored version of the received tactile input is a left-to-right gesture that can be compared with the valid left-to-right gesture patterns stored in the gesture table.

Thus, using various embodiments, the system may be utilized to detect for tactile input containing valid gesture patterns that are stored in the gesture table and, in some cases, valid gesture patterns derived from entries of the gesture table. Other tactile input are rejected, thus reducing noise/spurious gestures that may lead to false negatives and false positives. Each type of gesture accepted by the system, such as left-to-right and right-to-left gestures, may have multiple valid gesture patterns to accommodate for variations of swipe gestures in finger velocity, swipe angle, and/or other factors. In some aspects, through use of the gesture table, a robust, hardware-accelerated gesture recognition may be provided that accommodates comparison of incoming tactile input stream with a large number of gesture patterns while maintaining low overhead, low complexity, low cost, and low noise. For instance, parallelism may be achieved by using bit instructions that typically take a small number of machine cycles to complete.

Figure 1:
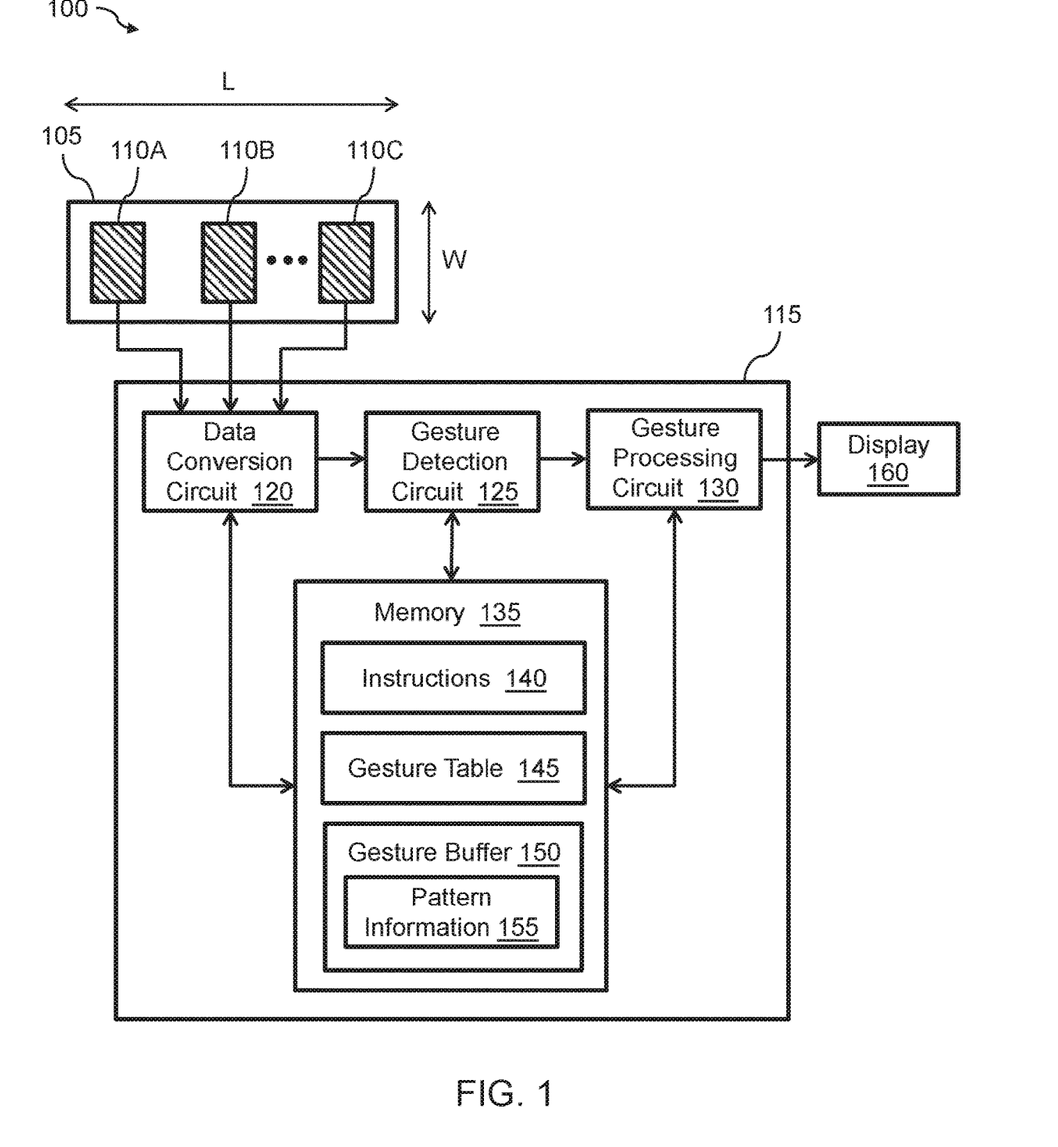
FIG. 1 shows a block diagram illustrating an example system for facilitating gesture detection in accordance with one or more embodiments of the present disclosure.

FIG. 1 shows a block diagram illustrating an example system 100 for facilitating gesture detection in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 100 includes a touchscreen 105 or portion thereof (e.g., referred to hereafter as touchscreen 105), touch sensors 110A-C (e.g., also referred to as tactile sensors or touch input sensors) associated with the touchscreen 105, a logic circuit 115, and a display 160. In an embodiment, the system 100 may be, or may be part of, a computing device that includes or is in communication with the touchscreen 105. The computing device may be, by way of non-limiting example, a desktop computer, a laptop computer, a mobile phone, a smart phone, a smart appliance, a navigation device, a media player, a game console, an accessory associated with any of these example computing devices, a combination thereof, and/or other types of computing devices.

The touchscreen 105 facilitates interaction of a user of the system 100 with the touch sensors 110A-C associated with the touchscreen 105. The touch sensors 110A-C may be designed to be sensitive to a human finger and/or other touch input instruments (e.g., a stylus), and may generate a signal (e.g., voltage signal) in response to tactile input (e.g., touch-based stimulus). Although FIG. 1 illustrates three touch sensors 110A-C, the number of touch sensors may be fewer or more than three. It is noted that ellipses between any the touch sensors 110B and 110C indicate that one or more additional touch sensors or no touch sensor is between the touch sensors 110B and 110C.

As an example, the touchscreen 105 may be provided as a small touch sensitive portion of a tablet device. The small touch sensitive portion may implement a slider that detects for a swipe gesture, such as a left-to-right swipe gesture. In this example, the slider may have a length L of around 3 cm to around 8 cm and a width W of around 2 cm to 4 cm. Such dimensions are provided by way of non-limiting example, and different dimensions may be utilized. In some cases, the user may be able to provide user preferences associated with the slider, such as to change the size of the slider and/or shape of the slider.

For example, instead of a slider that detects left-to-right and/or right-to-left gestures, the user may change the slider to a wheel that detects clockwise gestures and/or counter-clockwise gestures.

In some cases, in FIG. 1, the rectangular border around the touchscreen 105 may represent a graphical user interface (GUI) element that facilitates user interaction with the touchscreen 105. Alternatively or in addition, the rectangular border may represent a boundary (e.g., visible or non-visible) within which tactile input is considered to be intended for the touchscreen 105. In this regard, a tactile input within the rectangular border of the touchscreen 105 is determined to be intended for the touchscreen 105 whereas a tactile input outside of the rectangular border is determined to not be intended for the touchscreen 105.

The logic circuit 115 includes a data conversion circuit 120, gesture detection circuit 125, gesture processing circuit 130, and memory 135. The data conversion circuit 120 receives signals from each of the touch sensors 110A-C. The data conversion circuit 120 may determine, for each touch sensor of the touch sensors 110A-C, whether a tactile input is detected on the touch sensor. For each of the touch sensors 110A-C, the determination may be based on comparing the signal from the touch sensor to a threshold (e.g., a threshold voltage), and determining that a tactile input is detected when the threshold is exceeded and determining that a tactile input is not detected when the threshold is not exceeded. In this regard, the threshold may be considered a sensitivity parameter of the touch sensors 110A-C. In some aspects, the threshold may initially be a factory set threshold (e.g., set by a manufacturer of the touch sensors 110A-C). The user may be able to adjust the threshold as appropriate, such as during a calibration operation on the touchscreen 105, to allow the data conversion circuit 120 to determine whether a touch input is received from the user via the touch sensors 110A-C, thus facilitating improved user experience.

Based on the determination, the data conversion circuit 120 may generate an output indicative of a state of the touch sensors 110A-C. The output of the data conversion circuit 120 provides a state (e.g., '1' or '0') or information indicative of the state of each of the touch sensors 110A-C. The data conversion circuit 120 stores the output in a gesture buffer 150 (e.g., in the memory 135 of the logic circuit 115). The gesture buffer 150 may store pattern information 155, which includes the output of the data conversion circuit 120 at different moments in time. The pattern information 155 may be from a tactile input stream received from the touch sensors 110A-C when tactile input is performed by the user on the touchscreen 105.

In an aspect, the touch sensors 110A-C may be in one of two states (e.g., the touch sensors 110A-C are binary). Each of the touch sensors 110A-C may be in an active state when a finger (or other appropriate touch instrument) is present on the touch sensor or an inactive state when no finger is present on the touch sensor. The data conversion circuit 120 may associate touch sensors 110A-C in the active state with a '1' state and touch sensors 110A-C in the inactive state with a '0' state. As such, the active state may be referred to as a '1' state, finger-present state, or on state, and the inactive state may be referred to as a '0' state, finger-not-present state, or off state. In some cases, based on the states of the touch sensors 110A-C, the data conversion circuit 120 may encode the state of the touch sensors 110A-C into an appropriate format to facilitate comparison with entries of a gesture table 145 (e.g., stored in the memory 135 of the logic circuit 115). Each entry of the gesture table 145 may be a valid gesture pattern. The gesture table 145 may also be referred to as a valid gesture pattern table, valid pattern table, or a pattern table.

The gesture detection circuit 125 receives content (e.g., pattern information) from the gesture buffer 150. The gesture detection circuit 125 determines whether a valid gesture is detected based on the pattern information stored in the gesture buffer 150 and entries of the gesture table 145. In this regard, a portion of the pattern information may be a valid gesture pattern. When a valid gesture pattern is detected in the pattern information, the gesture detection circuit 125 generates an indication of the valid gesture pattern or type of valid gesture pattern determined to be detected in the pattern information 155. For example, the indication may indicate that a valid left-to-right gesture has been detected.

In some aspects, when the gesture table 145 contains valid left-to-right gesture patterns, the gesture detection circuit 125 determines that a valid left-to-right gesture is detected when one of the entries of the gesture table 145 matches the pattern information (or portion thereof) stored in the gesture buffer 150, and determines that no valid left-to-right gesture is detected when none of the entries of the gesture table 145 matches the pattern information stored in the gesture buffer 150. The pattern information (or portion thereof) may match the an entry of the gesture table 145 when the pattern information includes a sequence of tactile inputs over consecutive instances in time that matches a valid gesture pattern.

In an embodiment, the gesture detection circuit 125 may allow detection of a right-to-left gesture in addition to a left-to-right gesture. Detection of a right-to-left gesture may be facilitated by processing the output of the data conversion circuit 120 and/or by storing valid right-to-left gesture patterns (e.g., as part of the gesture table 145). In one example, the gesture table 145 may include valid left-to-right gesture patterns and valid right-to-left gesture patterns. Such an implementation may involve allocating more memory space of the memory 135 for the gesture table 145 but allow faster gesture detection.

In another example, the gesture table 145 may include valid left-to-right gesture patterns only. In this example, the data conversion circuit 120, gesture detection circuit 125, and/or other processing circuit may generate a mirrored version of the pattern information 155. As such, when the pattern information 155 has information indicative of a valid right-to-left gesture pattern having been performed by the user, the mirrored version of the valid right-to-left gesture pattern is a valid left-to-right gesture pattern contained in the gesture table 145. The mirrored version may also be referred to as a flipped version. In some cases, the mirrored version of the pattern information 155 may also be stored in the gesture buffer 150. In these cases, the gesture buffer 150 may include a base buffer and a mirrored buffer to facilitate gesture detection for both directions (e.g., left-to-right and right-to-left). For example, when the data conversion circuit 120 provides an output $b_A b_B b_C$, where $b_A$, $b_B$, and be are indicative of the state of the touch sensors 110A, 110B, and 110C, respectively, a mirrored version of the output is $b_C b_B b_A$.

In another example, alternatively or in addition to using a mirrored buffer, a mirrored version of the gesture table 145 may be generated and compared with the pattern information 155. As the mirrored version of the gesture table 145 are right-to-left gesture patterns (e.g., mirrored versions of the left-to-right gesture patterns stored in the gesture table 145), the gesture detection circuit 125 may detect valid right-to-left gesture patterns in the pattern information 155 using the mirrored versions of the gesture table 145. In this example, the data conversion circuit 120, gesture detection circuit 125, and/or other processing circuit may generate the mirrored version of the gesture table 145. In some cases, such as those in which speed of execution is prioritized over program size, the mirrored version of the gesture table 145 may be utilized in place of using a mirrored buffer (e.g., a mirrored version of the base buffer). For example, the mirrored version of the gesture table 145 may be determined at compilation or initialization time by duplicating the gesture table 145 and modifying the duplicated table to represent mirrored gesture patterns (e.g., also referred to as flipped gesture patterns). Pattern information of the gesture buffer 150 may be compared to the gesture table 145 and the mirrored version of the gesture table.

The gesture processing circuit 130 receives the indication from the gesture detection circuit 125 and performs one or more actions in response to the indication. For example, the gesture processing circuit may cause, or may generate control signals to cause, updating of the display 160 based on the indication (e.g., based on the gesture that has been detected). In one case, when a left-to-right swipe gesture is detected on the touchscreen 105, the gesture processing circuit 130 may cause the display 160 to present a user interface that provides the user with menu options, such as setting options to adjust a volume or brightness of the computing device that contains or is coupled to the system 100 and/or a power button to turn off the computing device.

In an embodiment, the data conversion circuit 120, gesture detection circuit 125, and/or gesture processing circuit 130 may be provided by one or more processing circuits of the system 100. The processing circuit(s) may perform operations to facilitate swipe gesture detection and, in some cases, other operations associated with the computing device that contains or is coupled to the system 100. Each processing circuit may be implemented as any appropriate processing device, such as, by way of non-limiting example, a central processing unit (CPU), a graphics processing unit (GPU), a digital signal processor (DSP), a logic device, a microcontroller, an application specific integrated circuit (ASIC), a programmable logic device (PLD), a combination thereof, and/or other device. The processing circuit(s) may include combinations of hardware and software processing functionality and may be provided with or communicatively coupled to other components to execute appropriate instructions, such as software instructions and/or processing parameters stored in the memory 135.

The memory 135 may be utilized to store information for facilitating operation of the system 100, including information for facilitating gesture detection. The memory 135 may store instructions 140 to be executed by the various components of the system 100 (e.g., the circuits 120, 125, and/or 130), outputs from the various components, parameters associated with performing the instructions 140, and/or other information. In an aspect, the memory 135 may store the gesture table 145 and, in some cases, a mirrored version of the gesture table 145. The gesture table 145 may provide combinations of valid tactile inputs for the gesture detection circuit 125. The memory 135 may include the gesture buffer 150 that stores the pattern information 155 and, in some cases, a mirrored version of the pattern information 155.

By way of non-limiting example, the memory 135 may include non-volatile memory (e.g., non-transitory machine readable medium), such as read-only memory (ROM), programmable ROM (PROM), erasable programmable ROM (EPROM), electrically erasable programmable (EEPROM), flash, non-volatile random-access memory (NVRAM), etc. The memory 135 may include volatile memory, such as random-access memory (RAM), dynamic RAM (DRAM), static RAM (SRAM), etc. Although in FIG. 1 the memory 135 is shown as being a part of the logic circuit 115, alternatively or in addition, the memory 135 may include memory external to the logic circuit 115 and coupled to the logic circuit 115.

The display 160 may be utilized to display an interface associated with an operating system (e.g., running on the system 100) and/or an application running on top of the operating system. In an embodiment, the display 160 may provide visual feedback to the user in response to a tactile input from the user on the touchscreen 105. For example, content presented to the user on the display 160 may change in response to a swipe gesture performed by the user on the touchscreen 105. In some cases, the display 160 may include the touchscreen 105. In other cases, the display 160 may be separate from the touchscreen. In some cases, the display 160 may include portions that are touch-sensitive (e.g., respond to touch input) and portions that are not touch-sensitive.

Figure 2A:
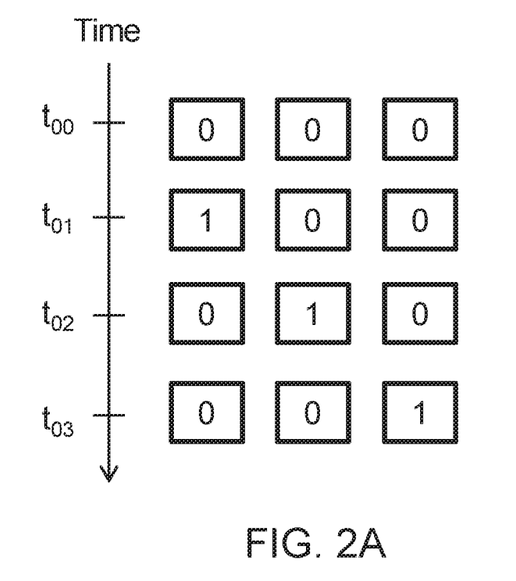
FIGS. 2A and 2B illustrate examples of valid gesture patterns defined by a sequence of tactile input states in accordance with one or more embodiments of the present disclosure.
Figure 2B:
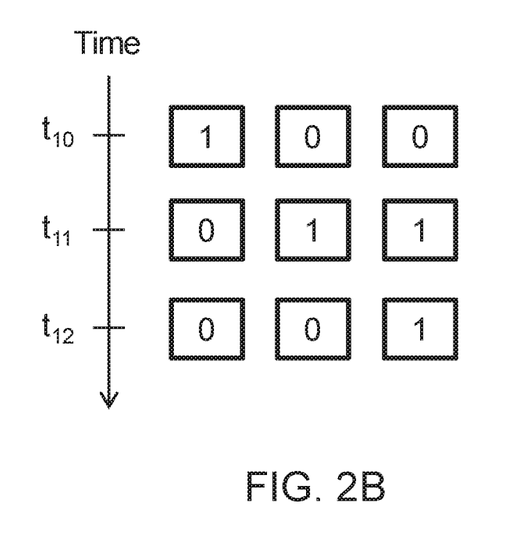

FIGS. 2A and 2B illustrate examples of valid gesture patterns defined by a sequence of tactile input states in accordance with one or more embodiments of the present disclosure. In FIGS. 2A and 2B, different columns may represent a state of different touch sensors and different rows may represent different instances in time. In an embodiment, the leftmost column, middle column, and rightmost column of FIGS. 2A and 2B may represent a touch input state of the touch sensors 110A, 110B, and 110C, respectively.

In an embodiment, FIGS. 2A and 2B show two example valid left-to-right swipe gestures. In this regard, when the sequence of tactile inputs in either FIG. 2A or 2B is detected by the touch sensors 110A-C, the gesture detection circuit 125 may determine that a left-to-right swipe gesture has been performed. In some cases, the sequence of tactile inputs shown in FIGS. 2A and 2B may be converted by the data conversion circuit 120 into an appropriate format for the gesture detection circuit 125 to use in comparing with entries of the gesture table 145. In the sequence of tactile inputs, a '1' for a touch sensor represents that the touch sensor detects a touch input (e.g., a finger is sufficiently touching the touch sensor) and a '0' for the touch sensor represents that the touch sensor does not detect a touch input (e.g., a finger is not sufficiently touching the touch sensor). Each touch sensor may be tuned with appropriate sensitivity (e.g., thresholds) to determine whether a finger is or is not touching the touch sensor.

In an embodiment, the data conversion circuit 120 may determine a state (e.g., 0 or 1) of each of the touch sensors 110A-C based on comparing signals (e.g., voltages, capacitances) provided by and/or associated with the touch sensors 110A-C with a threshold value. In FIG. 2A, at a time $t_{00}$, the touch sensors 110A, 110B, and 110C are all determined by the data conversion circuit 120 to be in an off state. At a time $t_{01} > t_{00}$, the touch sensors 110A, 110B, and 110C are determined to be in an on, off, and off state, respectively. At a time $t_{02} > t_{01}$, the touch sensors 110A, 110B, and 110C are determined to be in an off, on, and off state, respectively. At a time $t_{03} > t_{02}$, the touch sensors 110A, 110B, and 110C are determined to be in an off, off, and on state, respectively. In FIG. 2A, the tactile pattern {0, 0, 0} at time $t_{00}$ may be referred to as an initial no-touch pattern. FIG. 2B illustrates another valid left-to-right gesture. At time $t_{11}$, the tactile pattern {0, 1, 1} may accommodate for a case in which a touch instrument is determined to be on both (e.g., sufficiently on both) the touch sensors 110B and 110C.

In some cases, a gesture pattern may be completed by the user within around 300 ms to around 600 ms. In these cases, for example, a duration between steps of a gesture pattern (e.g., duration between $t_{00}$ and $t_{01}$, $t_{01}$ and $t_{02}$, etc. in FIG. 2A and duration between $t_{10}$ and $t_{11}$ and between $t_{11}$ and $t_{12}$ in FIG. 2B) may be around 70 ms to around 130 ms. In one implementation, for FIG. 2A, $t_{00}=0$ ms, $t_{01} \approx 120$ ms, $t_{02} \approx 240$ ms, and $t_{03} \approx 360$ ms. Other durations for completing a gesture pattern and between steps of a gesture pattern may be utilized. In general, such durations are implementation-specific and dependent on the environment. For example, a gesture swipe performed on a smartphone's screen may be faster due to better grip of the user on the smartphone when compared to a gesture swipe performed on a computing device on a moving boat, which may be slower and lumbered. In this example, the computing device may be a device integrated with and/or otherwise intended/designed for use on the moving boat, such as a navigation device or surveillance device.

The gesture patterns shown in FIG. 2A may be represented as a matrix or a stream, with each element (e.g., matrix element, bit) of the representation being indicative of a touch state (e.g., finger present, finger not present) of a touch sensor (e.g., 110A-C). For example, the gesture pattern shown in FIG. 2A may be represented by $$\text{Pattern}_{2A} = \begin{bmatrix} 0 & 0 & 0 \\ 1 & 0 & 0 \\ 0 & 1 & 0 \\ 0 & 0 & 1 \end{bmatrix} = 000100010001$$

The gesture pattern shown in FIG. 2B may be represented by $$\text{Pattern}_{2B} = \begin{bmatrix} 1 & 0 & 0 \\ 0 & 1 & 1 \\ 0 & 0 & 1 \end{bmatrix} = 100011001$$

In one case, for storage in a gesture table (e.g., the gesture table 145), each entry of the gesture table may be stored in one of the formats of $\text{Pattern}_{2A}$ and $\text{Pattern}_{2B}$ as provided above. In another case, $\text{Pattern}_{2A}$ and $\text{Pattern}_{2B}$ may be encoded into another format for storage. As one example, $\text{Pattern}_{2A}$ and $\text{Pattern}_{2B}$ may be encoded in a format of type uint32 as 0x00000111 and 0x00000119, respectively, and stored in the gesture table 145. In some cases, such as to prioritize program/memory size over execution time, some of the bits of the pattern encoding, such as the most significant bits, may be used to encode the number of steps associated with the gesture pattern. In this regard, $\text{Pattern}_{2A}$ has four steps and $\text{Pattern}_{2B}$ has three steps. For example, $\text{Pattern}_{2A}$ and $\text{Pattern}_{2B}$ may be encoded in a format of type uint32 as 0x40000111 and 0x30000119, respectively, where 4 and 3 are the number of steps in $\text{Pattern}_{2A}$ and $\text{Pattern}_{2B}$, respectively. In some cases, as a tactile input stream is received and stored as part of the pattern information 155, portions of the pattern information 155 may be encoded (e.g., by the data conversion circuit 120 and/or gesture detection circuit 125) into a format similar to the format of valid gesture patterns stored in the gesture table 145 to facilitate comparison.

In some cases, when a valid left-to-right gesture pattern $\text{Pattern}_1 = \{1, 0, 0, 0, 1, 0, 0, 0, 1\}$ is in the gesture table 145, then the $\text{Pattern}_{2A} = \{0, 0, 0, 1, 0, 0, 0, 1, 0, 0, 0, 1\}$ provided above may not be on the gesture table, since $\text{Pattern}_{2A}$ includes $\text{Pattern}_1$. In this regard, including both $\text{Pattern}_1$ and $\text{Pattern}_{2A}$ on the gesture table may be an inefficient use of the memory 135, since a tactile input that matches $\text{Pattern}_{2A}$ automatically matches $\text{Pattern}_1$. In other cases, both the $\text{Pattern}_1$ and $\text{Pattern}_{2A}$ may be included as valid left-to-right gestures in the gesture table.

As shown in FIGS. 2A and 2B, multiple patterns may be defined as valid left-to-right swipe gestures to accommodate for different finger velocity, finger size, swipe angle, environment factors, and/or other factors, which may cause variations (e.g., subtle variations) in the tactile input that is detected by the touch sensors 110A-C and provided to the data conversion circuit 120. Additional gesture patterns may be defined in the gesture table 145 as being valid left-to-right swipe gestures. Additional example gesture patterns for a left-to-right swipe gesture may be provided as shown below:

$$\text{Pattern}_C = \begin{bmatrix} 1 & 0 & 0 \\ 1 & 1 & 0 \\ 0 & 1 & 1 \\ 0 & 0 & 1 \end{bmatrix} = 100110011001$$

$$\text{Pattern}_D = \begin{bmatrix} 1 & 0 & 0 \\ 1 & 1 & 0 \\ 1 & 1 & 1 \\ 0 & 1 & 1 \\ 0 & 0 & 1 \end{bmatrix} = 100110111011001$$

As previously indicated, in some cases, such as to facilitate generation of the gesture table 145, gesture patterns may be provided in a representation more amenable to user consumption (e.g., a touchscreen designer's consumption), such as the matrix representation or bitstream representation provided above. An encoder of the system 100 may encode the representation utilized by the user, such as to facilitate more efficiency of storage (e.g., of entries of the gesture table) and/or processing of received tactile input (e.g., comparison between tactile input and entries of the gesture table). For example, the data conversion circuit 120 and/or the gesture detection circuit 125 may include the encoder.

For example, $\text{Pattern}_D$ above may be encoded in a 32-bit representation (e.g., uint32 representation) provided by {0x4DD9,0x5} since 00000000000000000|0100|1101|1101|1001={0x4DD9, 0x5} where the vertical bar | parses the bits of the $\text{Pattern}_D$ and 0x5 indicates that the pattern has five steps (e.g., spans five consecutive time instances). In this regard, the 0x4DD9 may be indicative of the valid gesture pattern and 0x5 may be indicative of the number of padding zeroes associated with the valid gesture pattern. In some cases, each entry of the gesture table 145 (e.g., each valid gesture pattern) may be stored in the memory 135 in a format corresponding to the example {0x4DD9,0x5} provided above. In some cases, if patterns are symmetrical, such as when left-to-right and right-to-left gesture patterns are mirrored versions of each other, the encoding of valid left-to-right gesture patterns may allow corresponding right-to-left gesture patterns to be determined. Although the foregoing examples use a uint32 format, other formats (e.g., hexadecimal, int32, int64) may be utilized based on the number of steps associated with valid gesture patterns and number of touch sensors used for the touchscreen. Use of formats associated with larger value types may facilitate scaling of the number of steps and/or number of touch sensors used for the touchscreen.

Although the foregoing primarily describes storage of valid left-to-right gesture patterns in the gesture table 145 while deriving valid right-to-left gesture patterns from the left-to-right gesture patterns (e.g., by mirroring the valid left-to-right gesture patterns), in some embodiments valid right-to-left gesture patterns may be stored in the gesture table 145 and the left-to-right gesture patterns derived from the valid right-to-left gesture patterns. In addition, although the foregoing describes left-to-right gestures and right-to-left gestures, in some embodiments other gestures may be utilized. For example, up-down and/or down-up gesture swipes, clockwise and/or counter-clockwise gesture swipes, and/or other gesture swipes may be implemented with appropriate positioning of touch sensors. Different types of gestures may utilize the same, similar, or different representations and encoding schemes than those presented above.

Figure 3:
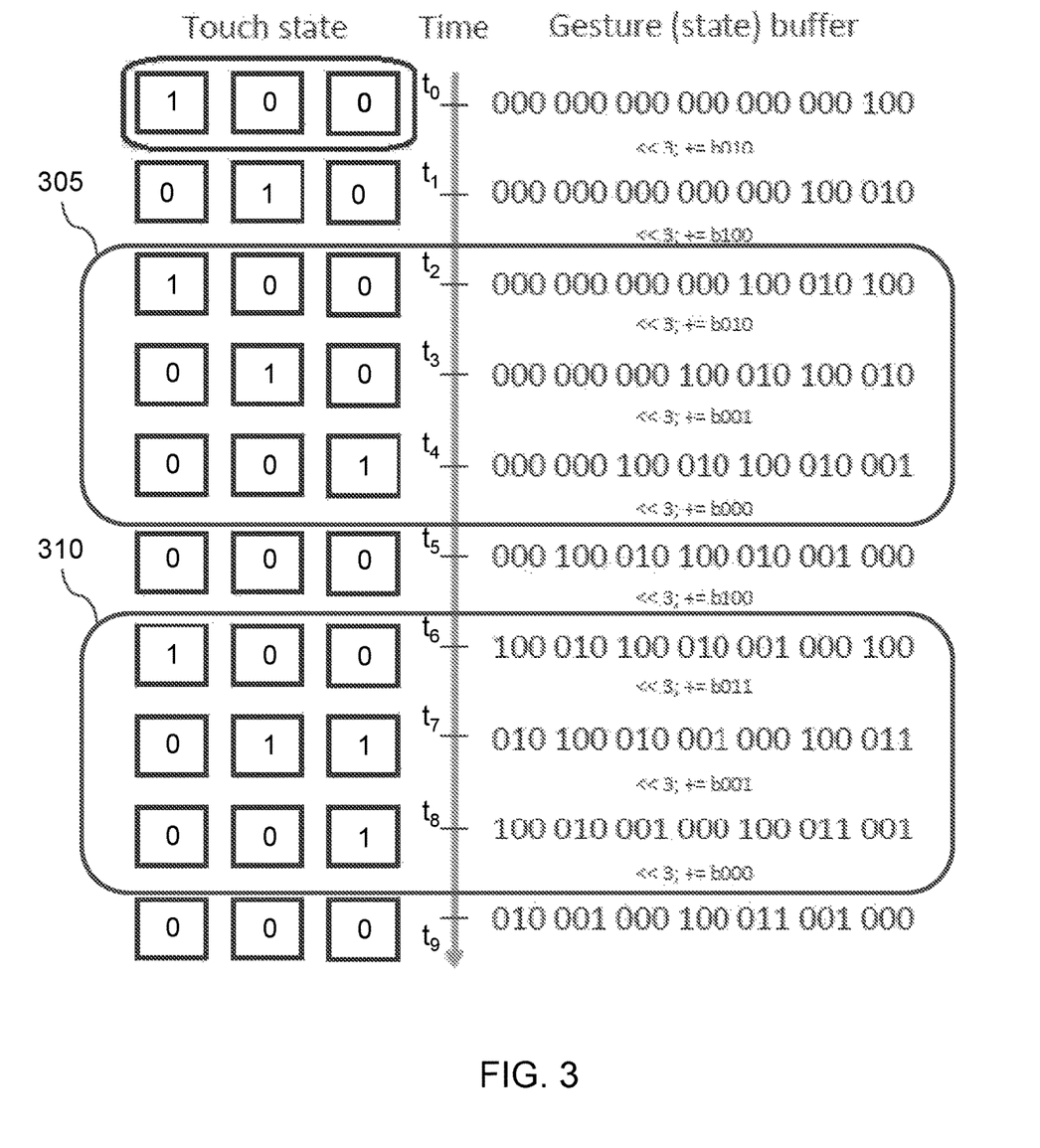
FIG. 3 illustrates an example touch state stream associated with tactile input received from a user and storage of the stream in a gesture buffer in accordance with one or more embodiments of the present disclosure.

FIG. 3 illustrates an example touch state stream associated with tactile input received from a user and storage of the stream in a gesture buffer in accordance with one or more embodiments of the present disclosure. The touch state stream may also be referred to as a tactile input stream. In an embodiment, the touch state stream is generated by the data conversion circuit 120 based on signals received from the touch sensors 110A-C, with the stream forming the pattern information 155 stored in the gesture buffer 150. In FIG. 3, each row of the touch state stream may provide an output of the data conversion circuit 120 at an associated instance in time. The stream (or portion thereof) stored in the gesture buffer (e.g., 150) is compared with the entries of the gesture table (e.g., 145), such as the entries shown in FIGS. 2A and 2B.

In FIG. 3, the gesture buffer is initiated to a zero state (e.g., all elements of the gesture buffer are zero). The tactile input (e.g., touch states associated with the tactile input) may be stored in the gesture buffer as the tactile input is being received from the user (e.g., the user is performing the swipe gesture in the touchscreen 105). At each time instance, the gesture buffer shifts its contents by three bits (e.g., represented by "<<3" in FIG. 3) and adds the touch state received at that time instant (e.g., represented by the operator "+=" in FIG. 3). For example, at time $t_0$, the touch input {1, 0, 0} is received from the user, and summarily (e.g., in real-time, substantially simultaneously) generated by the data conversion circuit 120 and stored in the gesture buffer. At time $t_1$, the touch input associated with {0, 1, 0} is received from the user, and summarily generated by the data conversion circuit 120 and stored in the gesture buffer. It is noted that a pattern 305 is not a valid left-to-right gesture pattern, since there is no {0, 0, 0} touch state prior to the pattern 305 (e.g., shown in FIG. 2A). A pattern 310 is the valid gesture pattern shown in FIG. 2B. In some cases, as shown in FIG. 3, the gesture buffer continues to store additional touch states even after a valid gesture pattern (e.g., the pattern 310) is detected. In other cases, the gesture buffer may be cleared (e.g., set to the zero state) when a valid gesture pattern is detected.

Although FIG. 3 illustrates a case in which the gesture buffer is compared with a gesture table with two gesture patterns, generally the gesture table includes more than two gesture patterns. In addition, although the gesture buffer of FIG. 3 is a circular buffer, other types of buffers may be utilized to implement the gesture buffer.

While the gesture buffer of FIG. 3 has 21 bits for storing the touch state stream, the gesture buffer may have more or fewer bits available for storing the touch state stream. In an aspect, a minimum size for the gesture buffer may be the number of bits used to represent the longest valid gesture pattern provided in the gesture table. In some cases, the number of bits of the gesture buffer for storing the touch state stream may be a multiple of the number of touch sensors (e.g., three in FIG. 3).

Figure 4A:
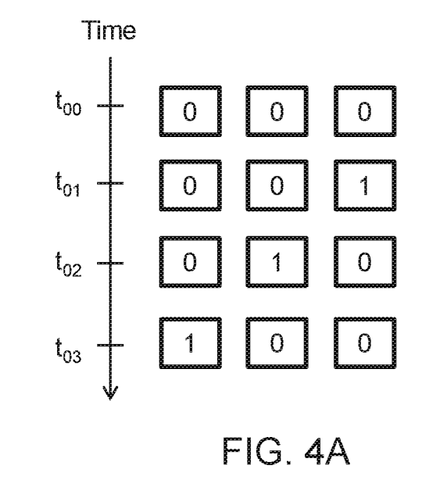
FIGS. 4A and 4B illustrate mirrored versions of the example gesture patterns of FIGS. 2A and 2B, respectively, in accordance with one or more embodiments of the present disclosure.
Figure 4B:
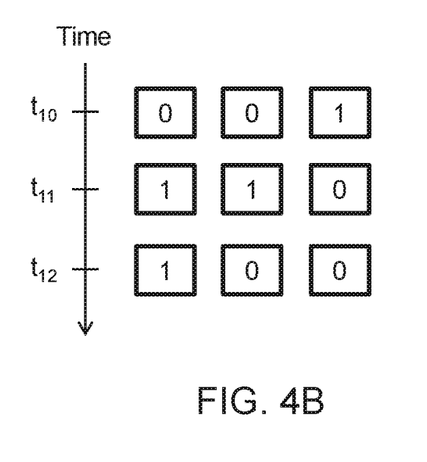

FIGS. 4A and 4B illustrate mirrored versions of the example gesture patterns of FIGS. 2A and 2B, respectively, in accordance with one or more embodiments of the present disclosure. In cases that the system 100 is utilized for accepting left-to-right gesture swipes as well as right-to-left gesture swipes, the gesture table 145 stored in the memory 135 may include valid left-to-right gesture swipes only, valid right-to-left gesture swipes only, or both types. In one case, storage of the valid left-to-right swipe gestures only or valid left-to-right swipe gestures only may help conserve memory. In this regard, when the valid left-to-right swipe gestures are stored in the gesture table 145, associated valid right-to-left swipe gestures may be determined based on the valid left-to-right swipe gestures and these determined valid right-to-left swipe gestures compared with the user's tactile input to detect right-to-left swipe gestures. As shown in FIGS. 2A and 2B, a valid right-to-left swipe gesture may be obtained by mirroring a corresponding left-to-right swipe gesture.

Although the foregoing primarily describes touch sensors that a spaced apart along a horizontal axis, in some embodiments, the touch sensors may be distributed differently. In one example, the touch sensors may be along a vertical axis, such as to facilitate detection of up-down gesture swipes and/or down-up gesture swipes. As another example, the touch sensors may be along a diagonal axis. As yet another example, the touch sensors may be provided in a circular manner, such as to provide a wheel for detecting circular gestures.

Figure 5A:
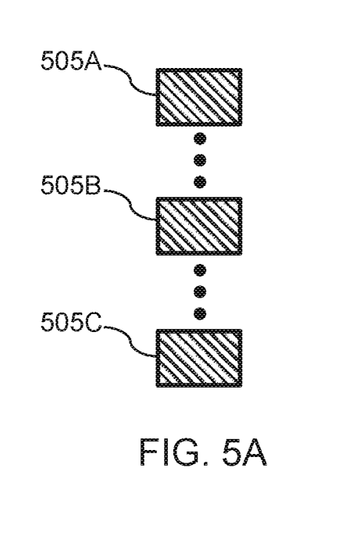
FIGS. 5A and 5B illustrate example arrangements of touch sensors.
Figure 5B:
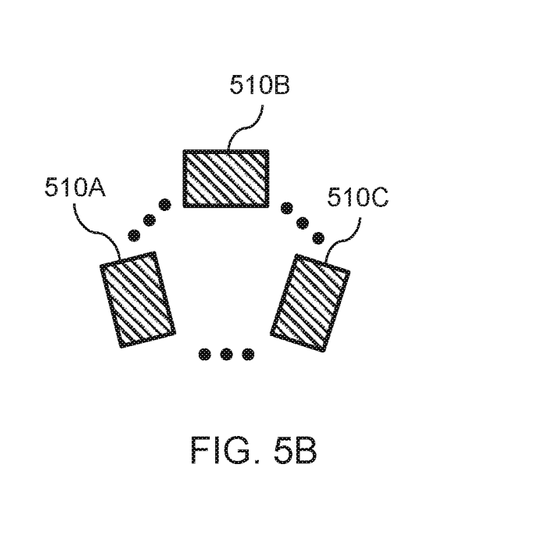

FIG. 5A illustrates an example of touch sensors 505A-C arranged in a vertical axis in accordance with one or more embodiments of the present disclosure. FIG. 5B illustrates an example of touch sensors 510A-C arranged in a wheel in accordance with one or more embodiments of the present disclosure. In FIGS. 5A and 5B, the ellipses between any two touch sensors indicate that one or more additional touch sensors or no touch sensor is between the touch sensors. In each of these examples, similar or same gesture patterns provided for valid left-to-right gesture patterns and valid right-to-left gesture patterns may be utilized to represent up-down, down-up, diagonal (e.g., lower-left to top-right or vice versa, lower-right to top-left or vice versa), circular, and/or other gesture patterns.

Figure 6:
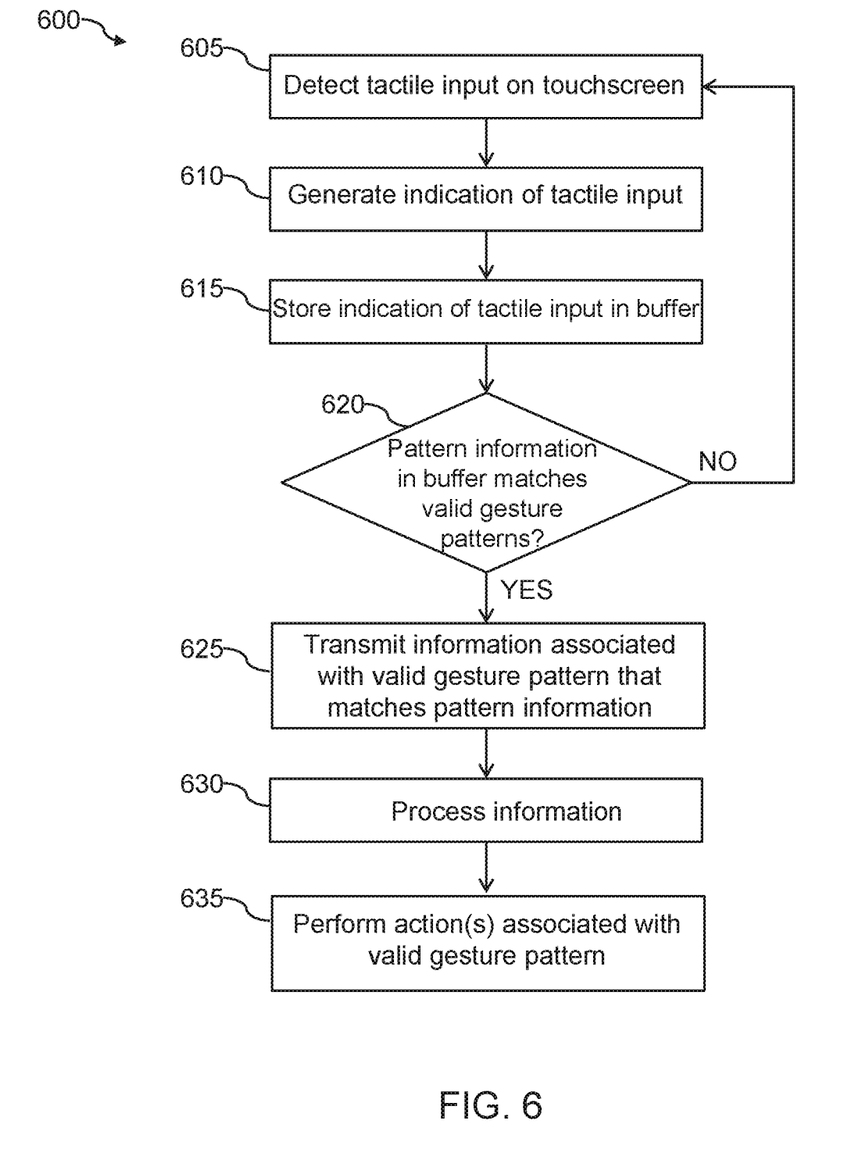
FIG. 6 illustrates a flow diagram of an example process for facilitating gesture detection in accordance with one or more embodiments of the present disclosure.

FIG. 6 illustrates a flow diagram of an example process 600 for facilitating swipe gesture detection in accordance with one or more embodiments of the present disclosure. For explanatory purposes, the example process 600 is primarily described herein with reference to the system 100 shown in FIG. 1; however, the example process 600 is not limited to the system 100 shown in FIG. 1. The blocks of example process 600 are described herein as occurring in serial, or linearly (e.g., one after another). However, multiple blocks of example process 600 may occur in parallel. In addition, the blocks of example process 600 need not be performed in the order shown and/or one or more of the blocks of example process 600 need not be performed.

At block 605, one of more of the touch sensors 110A-C detect a tactile input on the touchscreen 105. The tactile input may be detected on the touchscreen 105 when contact is made to the touchscreen 105 by a touch input instrument (e.g., a finger or a stylus). At block 610, the data conversion circuit 120 generates an indication of the tactile input. The indication may be a touch state associated with the tactile input. For example, with reference to FIG. 3, at time $t_2$ (e.g., a tactile input received at time $t_2$), the indication of the tactile input is {1, 0, 0}. At block 615, the gesture buffer 150 receives the indication from the data conversion circuit 120 and stores (e.g., buffers) the indication. In addition to the indication at a current time instance, the gesture buffer 150 may have previously stored tactile input received at previous time instances.

At block 620, the gesture detection circuit 125 determines whether the gesture buffer 150 stores content (e.g., pattern information) that matches one of a plurality of gesture patterns (e.g., predetermined gesture patterns). In FIG. 3, at time $t_3$, content stored in the gesture buffer 150 is {000 000 000 100 010 100 010} and pattern information may be the full set or any subset of the content. In some aspects, the gesture patterns used for comparison by the gesture detection circuit 125 may include gesture patterns stored in the gesture table 145. In some cases, the gesture patterns may also include gesture patterns derived from those stored in the gesture table 145. As an example, to allow detection of valid right-to-left gesture patterns when the gesture table 145 stores valid left-to-right gesture patterns, the gesture detection circuit 125 may mirror the valid left-to-right gesture patterns to obtain valid right-to-left gesture patterns for comparison with pattern information in the gesture buffer 150. As another example, to allow detection of valid right-to-left gesture patterns when the gesture table 145 stores valid left-to-right gesture patterns, a mirrored buffer may store a mirrored version of the gesture buffer 150 and the mirrored buffer's pattern information compared with the valid left-to-right gesture patterns of the gesture table 145 to determine whether valid right-to-left gesture patterns are detected.

When the gesture detection circuit 125 determines that the gesture buffer 150 does not store pattern information that matches a valid gesture pattern, the process 600 proceeds from block 620 to block 605. In this regard, additional tactile input is received from the user and stored in the gesture buffer 150.

When the gesture detection circuit 125 determines that the gesture buffer 150 stores pattern information that matches a valid gesture pattern, the process 600 proceeds from block 620 to block 625. At block 625, the gesture detection circuit 125 transmits information associated with the valid gesture pattern that matches the pattern information. The information may identify the valid gesture pattern and/or a gesture type (e.g., left-to-right or right-to-left gesture) associated with the valid gesture pattern. In some cases, when a valid gesture pattern is detected, the gesture buffer 150 may be cleared. In other cases, such as shown in FIG. 3, the gesture buffer 150 is not cleared after a valid gesture pattern is detected.

At block 630, the gesture processing circuit 130 processes the information received from the gesture detection circuit 125. At block 635, the gesture processing circuit 130 performs one or more actions associated with the valid gesture pattern. In one case, when the valid gesture pattern is a left-to-right gesture pattern, the gesture processing circuit 130 may cause, or generate appropriate control signals to cause, the display 160 of the system 100 to be updated according to the left-to-right gesture pattern. In one example, in response to the left-to-right gesture pattern received from the user, the gesture processing circuit 130 may cause, or generate appropriate control signals to cause, the display 160 to present menu options to the user, including a user to power down the computing device that includes or is coupled to the system 100.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method, comprising:
   detecting tactile input on a touchscreen using at least one of a plurality of sensors associated with the touchscreen;
   generating an indication of the tactile input, wherein the indication comprises a bitstream representation of the tactile input, and wherein each of a subset of bits of the bitstream representation is indicative of an on or off state of one of the plurality of sensors at a respective time instance;
   storing, in a buffer, the indication of the tactile input;
   determining whether the buffer stores pattern information that matches one of a plurality of predetermined swipe gesture patterns, wherein the pattern information comprises the indication, wherein each predetermined swipe gesture pattern of the plurality of predetermined swipe gesture patterns comprises one or more bits representing a number of steps associated with the predetermined swipe gesture pattern, and wherein each step is associated with a different time instance and a respective combination of states of the plurality of sensors at the time instance associated with the step; and
   performing an action associated with the one of the plurality of predetermined swipe gesture patterns when the pattern information is determined to match the one of the plurality of predetermined swipe gesture patterns.

2. The method of claim 1, wherein at least a subset of the plurality of predetermined swipe gesture patterns is stored in a lookup table.

3. The method of claim 2, wherein the subset is a first subset, and wherein each predetermined swipe gesture pattern of a second subset of the plurality of predetermined swipe gesture patterns is a mirrored version of one of the plurality of predetermined swipe gesture patterns of the first subset.

4. The method of claim 1, further comprising clearing the buffer when the pattern information is determined to match the one of the plurality of predetermined swipe gesture patterns.

5. The method of claim 1, further comprising:
   generating a set of swipe gesture patterns based on the plurality of predetermined swipe gesture patterns;
   determining whether the pattern information stored in the buffer matches one swipe gesture pattern of the set of swipe gesture patterns; and
   performing an action associated with the one swipe gesture pattern of the set of swipe gesture patterns when the pattern information is determined to match the one swipe gesture pattern of the set of swipe gesture patterns.

6. The method of claim 5, wherein the set of swipe gesture patterns comprises a mirrored version of the plurality of predetermined swipe gesture patterns.

7. The method of claim 1, wherein the buffer is a first buffer, the method further comprising:
storing, in a second buffer, a mirrored version of the pattern information stored in the first buffer, wherein the determining further comprises determining whether the mirrored version matches one of the plurality of predetermined swipe gesture patterns.

8. The method of claim 1, further comprising, when the pattern information is determined to not match any of the plurality of predetermined swipe gesture patterns, repeating the detecting, storing, and determining.

9. The method of claim 1, wherein the buffer is a circular buffer.

10. The method of claim 1, wherein:
the generating comprises:
generating a first set of bits of the bitstream representation indicative of an on or off state of each of the plurality of sensors at a first time instance; and
generating a second set of bits of the bitstream representation indicative of an on or off state of each of the plurality of sensors at a second time instance; and
the storing comprises:
storing, in a portion of the buffer, the first set of bits;
shifting the first set of bits in the buffer; and
storing, in the portion of the buffer, the second set of bits.

11. The method of claim 1, wherein the indication further comprises a representation of a number of steps associated with the tactile input, and wherein each step associated with the tactile input is associated with a different time instance.

12. A system, comprising:
one or more processors; and
memory comprising instructions stored therein, which when executed by the one or more processors, cause the one or more processors to perform the method of claim 1.

13. A system, comprising:
a plurality of sensors configured to receive tactile input associated with a touchscreen;
a data conversion circuit configured to generate an indication of the tactile input, wherein the indication comprises a bitstream representation of the tactile input, and wherein each of a subset of bits of the bitstream representation is indicative of an on or off state of one of the plurality of sensors at a respective time instance;
a buffer configured to store the indication of the tactile input;
a gesture detection circuit configured to determine whether the buffer is storing pattern information that matches one of a plurality of predetermined swipe gesture patterns, wherein the pattern information comprises the indication, wherein each predetermined swipe gesture pattern of the plurality of predetermined swipe gesture patterns comprises one or more bits representing a number of steps associated with the predetermined swipe gesture pattern, and wherein each step is associated with a different time instance and a respective combination of states of the plurality of sensors at the time instance associated with the step; and
a gesture processing circuit configured to perform an action associated with the one of the plurality of predetermined swipe gesture patterns when the pattern information is determined to match the one of the plurality of predetermined swipe gesture patterns.

14. The system of claim 13, wherein at least a subset of the plurality of predetermined swipe gesture patterns is stored in a lookup table.

15. The system of claim 13, wherein a set of swipe gesture patterns is associated with a mirrored version of the plurality of predetermined swipe gesture patterns, and wherein the gesture detection circuit is further configured to determine whether the pattern information stored in the buffer matches one swipe gesture pattern of the set of swipe gesture patterns.

16. The system of claim 13, wherein:
the buffer is a first buffer,
the system further comprising a second buffer configured to store a mirrored version of the pattern information stored in the first buffer, and
the gesture detection circuit is further configured to determine whether the mirrored version matches one of the plurality of predetermined swipe gesture patterns.

17. The system of claim 13, wherein the buffer is a circular buffer.

18. The system of claim 13, further comprising the touchscreen, wherein the action comprises adjusting content displayed on the touchscreen.

19. The system of claim 13, wherein each of the plurality of predetermined swipe gesture patterns is associated with a linear swipe gesture or a circular swipe gesture.

20. The system of claim 13, wherein:
the data conversion circuit is configured to:
generate a first set of bits of the bitstream representation indicative of an on or off state of each of the plurality of sensors at a first time instance; and
generate a second set of bits of the bitstream representation indicative of an on or off state of each of the plurality of sensors at a second time instance; and
the buffer is configured to:
store, in a portion of the buffer, the first set of bits;
shift the first set of bits in the buffer; and
store, in the portion of the buffer, the second set of bits.

* * * * *

UNITED STATES PATENT AND TRADEMARK OFFICE
CERTIFICATE OF CORRECTION

| | |
|---|---|
| PATENT NO. | : 11,195,000 B2 |
| APPLICATION NO. | : 16/267052 |
| DATED | : December 7, 2021 |
| INVENTOR(S) | : Hawker |

It is certified that error appears in the above-identified patent and that said Letters Patent is hereby corrected as shown below:

In the Specification

In Column 6, Line 35 change "be" to --$b_c$--.

In Column 8, Line 32 change "too" to --$t_{00}$--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*